United States Patent [19]

Sprauer

[11] 3,852,226
[45] *Dec. 3, 1974

[54] MELT-CONDENSED POLYAMIDE INTERPOLYMERS

[75] Inventor: Jerome William Sprauer, Wilmington, Del.

[73] Assignee: E. I. du Pont de Nemours and Company, Wilmington, Del.

[ * ] Notice: The portion of the term of this patent subsequent to Jan. 25, 1989, has been disclaimed.

[22] Filed: Apr. 19, 1973

[21] Appl. No.: 352,740

Related U.S. Application Data

[63] Continuation-in-part of Ser. No. 208,930, Dec. 16, 1971, Pat. No. 3,784,495.

[52] U.S. Cl............... 260/18 N, 161/227, 161/228, 260/78 A, 260/857 R
[51] Int. Cl............................................. C08g 20/04
[58] Field of Search............ 260/18 N, 404.5, 78 A, 260/857 R

[56] References Cited
UNITED STATES PATENTS
3,637,551  1/1972  Sprauer........................ 260/18

Primary Examiner—Donald E. Czaja
Assistant Examiner—Eugene C. Rzucidlo

[57] ABSTRACT

Melt-condensed polyamide interpolymers consisting essentially of at least four different recurring polyamide repeat units in which (a) about 35 to 55 percent of the amide equivalents are polymethylene-ω-aminoacid repeat units of six to 20 carbon atoms, (b) about 10 to 30 percent of the amide equivalents are diamine diacid repeat units in which the diamine is polymethylene diamine of six to 20 carbon atoms and the diacid is polymethylene diacid of six to 20 carbon atoms, (c) about 10 to 30 percent of the amide equivalents are diamine diacid repeat units in which the diamine is polymethylene diamine of six to 20 carbon atoms and the diacid is polymethylene diacid of six to 20 carbon atoms different from the diacid of (b) above, and (d) about 10 to 30 percent of the amide equivalents are diamine diacid repeat units in which the diamine is polymethylene diamine of six to 20 carbon atoms and the diacid is polymethylene diacid of six to 20 carbon atoms different from the diacids of (b) and (c) above, have unusual solubility and/or low melting properties. These interpolymers are soluble to the extent of at least about 20 percent in common solvents at room temperature and/or melt completely at about 125° C.

9 Claims, No Drawings

MELT-CONDENSED POLYAMIDE INTERPOLYMERS

CROSS-REFERENCE TO RELATED APPLICATION

This is a continuation-in-part of my copending application Ser. No. 208,930, filed Dec. 16, 1971, now U.S. Pat. No. 3,784,495.

BACKGROUND OF THE INVENTION

1. Field of the Invention

This invention relates to novel melt-condensed polyamide interpolymers which are soluble in common solvents at room temperature and/or melt completely at about 125° C.

2. Description of the Prior Art

Linear polyamides with a number-average molecular weight of at least 10,000, which are commonly called "nylons," are valued for a combination of properties including toughness, hardness, inertness, solvent resistance, abrasion resistance, and relatively high crystalline melting point.

The uses of nylons have been limited in some areas by their insolubility in common volatile industrial solvents. Certain nylon interpolymers have been described in U.S. Pat. No. 2,285,009, for example, which are soluble in hot alcohol, such as methanol, ethanol, etc. However, previously known nylons have been relatively insoluble in common industrial solvents at room temperature. Moreover, when concentrated solutions of previously known nylons are prepared by heating, they gel upon storage at room temperature. Hence, previous solvent formulations of nylons have had to be applied hot or shortly following a heating step which effected solution. Therefore, it would be desirable to provide a nylon which is relatively soluble in common solvents at room temperature.

There has also been considerable interest in providing low melting nylons for uses such as textile fusibles. French Pat. No. 2,084,510 proposes the use of a nylon 6/66/69 as a textile fusible adhesive. It is an object of the present invention to provide nylons having lower melting points than those disclosed in the French patent.

SUMMARY OF THE INVENTION

Melt-condensed polyamide interpolymers have now been discovered which have one or both of the advantageous characteristics of being relatively soluble at room temperature in common volatile industrial solvents and completely melting at about 125° C., while at the same time retaining valued nylon properties. These melt-condensed polyamide interpolymers consist essentially of at least four different recurring polyamide repeat units in which (a) about 35 to 55 percent of the amide equivalents are polymethylene-ω-amino-acid repeat units of six to 20 carbon atoms, (b) about 10 to 30 percent of the amide equivalents are diamine diacid repeat units in which the diamine is polymethylene diamine of six to 20 carbon atoms and the diacid is polymethylene diacid of six to 20 carbon atoms, (c) about 10 to 30 percent of the amide equivalents are diamine diacid repeat units in which the diamine is polymethylene diamine of six to 20 carbon atoms and the diacid is polymethylene diacid of six to 20 carbon atoms different from the diacid of (b) above, and (d) about 10 to 30 percent of the amide equivalents are diamine diacid repeat units in which the diamine is polymethylene diamine of six to 20 carbon atoms and the diacid is polymethylene diacid of six to 20 carbon atoms different from the diacids of (b) and (c) above, said polyamides have at least one characteristic selected from the group consisting of (1) being soluble to the extent of at least about 20 percent, based on the weight of solution, at 23° C. in a solvent mixture containing 2 parts by weight of methanol and 1 part by weight of toluene, and (2) melting completely at 125° C.

DETAILED DESCRIPTION OF THE INVENTION

The polyamide interpolymers of this invention consist essentially of at least four different recurring polyamide repeat units. By "polyamide repeat unit" is meant, for example, a polymer unit of the structure (I) 

or (II) 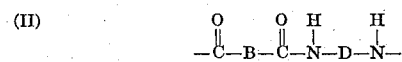

in which A, B and D are the same or different inert divalent linking radicals, for example, hydrocarbylene groups which preferably are polymethylene groups.

The term "consisting essentially of," as used throughout the specification and claims, is intended to include unspecified polyamide repeat units which do not materially affect the basic and novel characteristics of the polyamide. That is, this term excludes polyamides containing unspecified repeat units of the type and in amounts which prevent the improved solubility and/or melting properties described herein from being realized. For example, a minor amount of diethylene triamine can be advantageously used in place of hexamethylene diamine to introduce a low concentration of secondary amine in the polymer chain as shown in Example 1. Up to about 20 percent by weight of polyamide-forming monomer ingredients such as branched alkylene diamines, diacids, or aminoacids which are outside the scope of the specified monomers can be used for special purposes. Monofunctional amines or acids or equivalents may also be used to control molecular weight.

The quantity of each required repeat unit in the polyamides of this invention is expressed in terms of the percentage of the total amide equivalents in the polymer. The number of amide equivalents in a given repeat unit is determined by the number of amide linkages represented by that repeat unit. The amide equivalent weight of a given repeat unit is determined by dividing the molecular weight of the repeat unit by the number of amide equivalents represented by that repeat unit. For example, the amide equivalent weight of an aminoacid repeat unit of structure (I) above is the molecular weight of the aminoacid repeat unit. The amide equivalent weight of a diamine diacid repeat unit of structure (II) above is one-half the molecular weight of the diamine diacid repeat unit.

In order for the polyamide interpolymers of this invention to contain at least four different repeat units, they must be derived from at least five different polyamide-forming monomers. One of the required polyamide-forming monomers is polymethylene-omega-aminoacid of six to 20 carbon atoms. Suitable aminoacids include 6-aminocaproic, 7-aminoheptanoic, 8- aminocaprylic, 9-aminomonanoic, 10-aminodecanoic, 11-aminoundecanoic, 17-aminoheptadecanoic acid, and mixtures thereof, and the like.

A second required polyamide-forming monomer is polymethylene diamine of six to 20 carbon atoms. Suitable polymethylene diamines include hexamthylene, heptamethylene, octamethylene, nonamethylene, decamethylene, undecamethylene, dodecamethylene, tridecamethylene, octadecamethylene diamines, and mixtures thereof, and the like.

The third, fourth and fifth required polyamide-forming monomers are diacids. These diacids include at least three different polymethylene diacids of six to 20 carbon atoms. Suitable polymethylene diacids include adipic, pimelic, suberic, azelaic, sebacic, dodecanedioic, brassylic, tetradecanedioic, octadecanedioic acids, and mixtures thereof, and the like.

It is not necessary that the above-recited polyamide forming monomers be used per se in the polymerization reaction. It is necessary only that the resulting polyamide repeat units correspond to those derived from the recited monomers. The actual materials used in the polymerization reaction may be the recited monomers or polyamide-forming derivatives of these monomers, such as the acid chloride, ammonium salt, ester, half-ester, and the like. Lactams may be used in place of aminoacids, such as caprolactam in place of 6-aminocaproic acid.

In one embodiment of the invention, the soluble melt-condensed polyamide interpolymers consist essentially of at least four different recurring polyamide repeat units in which (a) 35 to 55 percent of the amide equivalents are polymethylene-ω-aminoacid repeat units of six to 20 carbon atoms, (b) 10 to 30 percent of the amide equivalents are diamine diacid repeat units in which the diamine is polymethylene diamine of six to 20 carbon atoms and the diacid is polymethylene diacid of six to 20 carbon atoms, (c) 10 to 30 percent of the amide equivalents are diamine diacid repeat units in which the diamine is polymethylene diamine of six to 20 carbon atoms and the diacid is polymethylene diacid of six to 20 carbon atoms different from the diacid of (b) above, and (d) 10 to 30 percent of the amide equivalents are diamine diacid repeat units in which the diamine is polymethylene diamine of six to 20 carbon atoms and the diacid is polymethylene diacid of six to 20 carbon atoms different from the diacids of (b) and (c) above.

The preferred soluble melt-condensed polyamide interpolymers are those in which (a) about 40 to 55 percent of the amide equivalents are omega-aminocaproic acid repeat units, (b) about 10 to 25 percent of the amide equivalents are hexamethylene adipamide repeat units, (c) about 10 to 25 percent of the amide equivalents are hexamethylene diamine diacid repeat units in which the diacid is polymethylene diacid of nine to 12 carbon atoms, and (d) about 10 to 25 percent of the amide equivalents are hexamethylene diamine diacid repeat units in which the diacid is polymethylene diacid of nine to 12 carbon atoms different from the diacid of (c) above.

In another embodiment of this invention, the low melting melt-condensed polyamide interpolymers consist essentially of at least four different recurring polyamide repeat units in which (a) 35 to 55 percent of the amide equivalents are omega-aminocaproic acid repeat units, (b) 10 to 30 percent of the amide equivalents are diamine diacid repeat units in which the diamine is polymethylene diamine of six to 20 carbon atoms and the diacid is selected from the group consisting of adipic, azelaic, sebacic and dodecanedioic acids, (c) 10 to 30 percent of the amide equivalents are diamine diacid repeat units in which the diamine is polymethylene diamine of six to 20 carbon atoms and the diacid is a member of the group consisting of adipic, azelaic, sebacic and dodecanedioic acids which is different from the diacid of (b) above, and (d) 10 to 30 percent of the amide equivalents are diamine diacid repeat units in which the diamine is polymethylene diamine of six to 20 carbon atoms and the diacid is a member of the group consisting of adipic, azelaic, sebacic and dodecanedioic acids which is different from the diacids of (b) and (c) above.

Preferred low melting melt-condensed polyamides are those in which the polymethylene diamine is either hexamethylene diamine or a mixture of hexamethylene diamine and up to 30 mole percent of an aliphatic diamine of two to 20 carbon atoms. The mixtures of hexamethylene diamine can be made using, for example, ethylene diamine, propylene diamine and 2-methyl pentane-1,5-diamine. Also preferred are polyamides in which 10 to 15 percent of the amide equivalents are diamine diacid in which the diacid is adipic acid.

Preferably, the polyamides of this invention have a crystalline heat of fusion of 3 to 15 calories per gram determined as described below.

The method of forming polyamides by melt-condensation is well known to those skilled in the art being described, for example, in U.S. Pat. Nos. 2,252,554 and 2,285,009. The reaction is carried out by heating diacids and diamines, or their polyamide-forming derivatives, and, if desired, aminoacids or their polyamide-forming derivatives, at temperatures of about 150° to 300° C. while driving off water and continuing the reaction until the desired molecular weight is obtained.

The resulting polyamides will contain substantially equimolar amounts of carbonyl groups and imine groups. The polymer end groups will be carboxylic acid and amine, one of which may be in excess depending upon which reactant was present in excess. Preferably, the polymers of this invention will have balanced ends, that is, will contain no more than about $50 \times 10^{-6}$ equivalents per gram of excess amine-ends or excess carboxyl-ends.

However, for some applications requiring good adhesion to certain substrates, it is desirable to modify the polyamide interpolymer to contain about 10 to $100 \times 10^{-6}$ equivalents per gram of excess amine-ends over carboxyl-ends with at least some of the excess amine being present as secondary amine links in the polymer chain. This is conveniently accomplished by replacing a small amount, for example, about 1 percent, of the polymethylene diamine with an equimolar amount of polyethylene polyamine, such as, for example, diethylene triamine. In this case, prolonged high temperature finishing of the melt condensation should be avoided to minimize formation of imidazoline rings, according to known chemistry.

Since increasing the molecular weight of a polyamide increases its strength and toughness, it is desirable to adjust the molecular weight of the polyamides of this invention to the highest value consistent with the application requirements. Molecular weight is quantitatively related to melt viscosity and is expressed in terms of melt index which is an empirical measurement of inverse melt viscosity. Normally it is advantageous to adjust the products of this invention to a melt index of about 0.1 to 200 at 190° C. Preferably the polyamides of this invention have a melt index of about 1 to 20. It is well known, of course, to regulate the molecular weight of melt-condensed polyamides by inclusion of small amounts of monofunctional amines or acids.

Many of the polyamides of this invention are soluble at room temperature at a concentration of at least about 20 percent by weight in a solvent mixture containing 2 parts of methanol and 1 part of toluene. The polyamides of this invention may exhibit greater solubility than 20 percent and are more soluble still at higher temperature. Also, they are more soluble still in a mixture of chloroform and methanol which is an especially effective mixture for dissolving polymethylene polyamides. However, since aromatic hydrocarbons are preferred as industrial solvents for many purposes as compared to chlorohydrocarbons based on toxicity and pollution considerations, they have been chosen as the criterion for measuring the unusual solubility of the polyamides of this invention.

Although a mixture of two parts by weight of methanol to one part by weight of toluene is used to specify the solubility characteristics of the polyamides of this invention, this is not necessarily the optimum ratio of toluene and methanol for any given polyamide. Other solvents may also be used in practical applications. The choice of solvent is not limited to those which are effective at the defined conditions of 20 percent polyamide concentration at 23°C. Suitable solvents include monohydric alcohols such as methanol, ethanol, propanol, isopropanol, the several butyl alcohols, amyl alcohols, methoxyethanol, ethoxyethanol, benzyl alcohol, furfuryl alcohol, and the like; aromatic hydrocarbons such as benzene, toluene, xylene, and the like; chlorohydrocarbons such as methylene chloride, chloroform, ethylene dichloride, methyl chloroform, trichloroethylene, and the like; and mixtures thereof.

One may test solubility by dissolving the polyamide in a suitable solvent at chosen concentrations with stirring at or near reflux and observing stability of the resulting solution at room temperature, a soluble composition being indefinitely stable. In borderline cases, this requires long waiting to determine whether or not the solution will gel. A preferred procedure is to stir the chosen concentrations at room temperature, in which case homogeneous solutions will be attained with soluble compositions within several hours. In general, a homogeneous solution obtained by stirring at room temperature will be indefinitely stable at the same temperature.

Many of the polyamides of this invention melt completely at 125° C. Comparison of melting points in the literature is frequently confusing because of the diverse, imprecise, and subjective methods used for the measurement when applied to compositions having a broad melting range. Melting points are defined herein by the minimum flow temperature, which corresponds to the upper limit of the crystalline melting range. The minimum flow temperature can be conveniently and objectively determined by placing a sample in the melt index apparatus (ASTM D-1238) with the standard orifice and 2,160 g. load at a temperature about 20° C. below the flow temperature, heating at a uniform rate of 1° C./min., and observing the lowest temperature at which the polymer flows from the capillary orifice. With relatively crystalline materials a minimum flow temperature so determined corresponds closely with the complete disappearance of crystallinity as determined on a hot stage polarizing microscope (ASTM D-2117). Frequently reported polymer softening points, polymer melt temperatures, and the like are usually several degrees lower than the minimum flow temperature.

The polyamides of this invention in addition to their outstanding solvent solubility and low melting characteristics also retain valued nylon properties, that is, they possess a substantial degree of crystallinity. Generally, these polyamides have a crystalline heat of fusion of about 3 to 15 calories per gram. They also generally have a minimum flow temperature, that is, the temperature of incipient flow (temperature of complete crystalline melting), of between about 110° C. and 150° C.

The polyamide interpolymers of this invention are particularly useful in applications such as adhesives, coatings, and binders such as in thread bonding wherein they can be applied from a solution. The high solubility of these polymers allows them to be readily formulated in solution with polyepoxides, curing agents, accelerators, pigments, antioxidants, etc., according to known art.

The low melting polyamides of this invention have utility in powder form for textile fusible adhesives and generally for textile adhesive uses. They have utility in formulating prepregs and sheet adhesives, especially nylon-epoxy adhesives and metal adhesives for aerospace construction. More broadly the compositions have utility for thermoplastic assembly adhesives, especially if melt-silanated according to U.S. Pat. No. 3,637,550 for use on bare metal substrates.

EXAMPLES OF THE INVENTION

The following examples, illustrating the novel polyamides disclosed herein, are given without any intention that the invention be limited thereto. All parts and percentages are by weight unless otherwise specified.

In these examples, melt index is measured according to ASTM test method D 1238. All melt index numbers were obtained with the standard orifice at 190° C. using the 2,160 gram weight, equivalent to 43.25 psi. differential pressure. Minimum flow temperature is measured by observing the temperature of incipient flow of a sample in the melt index apparatus as the temperature is gradually increased from below the melting point using a standard orifice and load (2,160 g.).

Heat of fusion is measured by molding a sample of polymer into a small disc, drying, encapsulating in a small crimped dish, melting, and annealing the sample by programmed cooling at 1° C. per minute or less. The sample is evaluated by known methods by differential thermal analysis in a Du Pont "Differential Scanning Colorimeter" (DSC) and compared with known heat of fusion standards.

EXAMPLE 1

A polymer having the following calculated percent of total amide equivalents was prepared by charging the following polyamide-forming monomers to a resin kettle:

| | Parts | Percent of Total Amide Equivalents |
|---|---|---|
| Caprolactam | 288.5 | 51 |
| Hexamethylene Diamine | 139.5 | — |
| Adipic Acid | 51.1 | 14 |
| Sebacic Acid | 93.7 | 18.5 |
| Dodecanedioic Acid | 95.1 | 16.5 |
| Diethylene Triamine | 2.6 | — |
| Acetic Acid | 1.5 | — |

The diethylene triamine and acetic acid were added in minor proportions for incidental control of molecular weight and property behavior in adhesive applications.

Water was removed by known procedures by heating with stirring and purging with nitrogen at atmospheric pressure until the temperature reached 250° C., holding for 0.7 hour at 250°–253° C., and discharging to metal blocks with abherent surfaces.

The polymer was characterized by methods described above with the following results:

| Melt Index, decigrams/min. | 8.4 |
|---|---|
| Minimum Flow Temperature, °C. | 130 |
| Heat of Fusion, cal./g. | 8.6 |

The polymer dissolved on stirring at 20 percent concentration, based on the weight of solution, at room temperature in a mixture of 2 parts of methanol and 1 part of toluene.

EXAMPLE 2

A polymer having the following calculated percent of total amide equivalents was prepared in a manner similar to the procedure of Example 1 from the following polyamide-forming monomers.

| | Parts | Percent of Total Amide Equivalents |
|---|---|---|
| Caprolactam | 249.5 | 44 |
| Hexamethylene Diamine | 156.3 | — |
| Adipic Acid | 47.5 | 13 |
| Azelaic Acid | 61.1 | 13 |
| Sebacic Acid | 75.9 | 15 |
| Dodecanedioic Acid | 86.3 | 15 |
| Acetic Acid | 0.8 | — |
| Characterization tests were: | | |
| Melt Index, decigrams/min. | | 37 |
| Minimum Flow Temperature, °C. | | 118 |
| Heat of Fusion, cal./g. | | 6.7 |

The polymer was soluble at 20 percent concentration, based on the weight of solution, at room temperature in a mixture of 2 parts of methanol and 1 part of toluene.

EXAMPLE 3

The following ingredients were charged to a resin kettle to yield an interpolymer having the following calculated percent of total amide equivalents:

| | Parts | % of Total Amide Equivalents |
|---|---|---|
| Caprolactam | 259.0 | 45.8 |
| Hexamethylene Diamine | 155.0 | — |
| Diethylene Triamine | 2.6 | — |
| Adipic Acid | 46.0 | 12.6 |
| Sebacic Acid | 111.3 | 22.0 |
| Dodecanedioic Acid | 113.0 | 19.6 |
| Acetic Acid | 1.5 | — |

Water was removed by known procedures by heating with stirring and purging with nitrogen at atmospheric pressure until the temperature reached about 215° C.; analyzing for end groups; adding 0.38 part of hexamethylene diamine to correct to nominal $20 \times 10^{-6}$ eq./g. excess amine; further heating, stirring, and purging for about 1.5 hours until the temperature reached 251° C.; and discharging to metal blocks with abherent surfaces.

In this composition the diethylene triamine, which amounts to 1 percent of the total diamine, was added to give a nominal $39 \times 10^{-6}$ eq./g. secondary amine content, which has a very minor effect on melting range. Acetic acid in the amount of $39 \times p^{-6}$ eq./g. was added as a molecular weight regulator.

Characterization tests were:

| Melt Index, decigrams/min. | 13 |
|---|---|
| Minimum Flow Temperature, °C. | 122 |
| Heat of Fusion, cal./g. | 12.6 |

EXAMPLE 4

The composition of Example 3 was prepared on larger scale to produce a polymer with:

| Melt Index, decigrams/min. | 46 |
|---|---|
| Minimum Flow Temperature, °C. | 124 |

This material was ground and classified to 40 to 100 mesh powder (U.S. Standard Sieve). The powder was sprinkled as uniformly as possible over a cloth specimen at a loading of 0.5 oz./yd.$^2$, sintered beneath an infrared source just sufficient to tack to the cloth, laminated against another piece of the same cloth in a hot head press at 149° C. and a 20-Second nominal seal time. 1-inch strips were cut from the laminate and pulled in T-peel using an Instron tensile testing machine at 10 cm./min. with the following results:

| Cloth | T-Peel lb./in. |
|---|---|
| Cotton | 1.4 |
| Wool | 1.1 |
| Nylon | 2.7 |
| Orlon | 4.1 |
| Dacron/Cotton | 2.8 |

Another portion of the above polymer was ground and classified to 70–200 mesh powder. This powder was printed onto a hot cotton cloth through a screen containing 0.037 inch holes on 0.10 inch centers to simulate powder-point printing. The printed cloth was laminated against another piece of cotton cloth in a hot press at 135° C. and a 20-second seal time. 1-inch strips were cut and pulled in T-peel as above. Duplicate strips were subjected to simulated drycleaning cycle five times, dried and pulled in T-peel. Another set of strips was subjected to simulated laundering cycle four times. Results were:

| | |
|---|---|
| Initial T-peel, lb./in. | 0.90 |
| Retention of Peel on Drycleaning, % | 89 |
| Retention of Peel on Laundering, % | 76 |

EXAMPLE 5

A polymer was prepared similar to Example 3 except that 9 percent of the hexamethylene diamine and the diethylene triamine were replaced with an equivalent amount of ethylene diamine:

| | Parts | % of Total Amide Equivalents |
|---|---|---|
| Caprolactam | 259.5 | 45.8 |
| Hexamethylene Diamine | 143.8 | — |
| Ethylene Diamine | 8.27 | — |
| Adipic Acid | 46.1 | 12.6 |
| Sebacic Acid | 111.4 | 22.0 |
| Dodecanedioic Acid | 113.0 | 19.6 |
| Acetic Acid | 2.4 | — |

Characterization tests were:

| | |
|---|---|
| Melt Index, decigrams/min. | 56 |
| Minimum Flow Temperature, °C. | 114 |
| Heat of Fusion, cal./g. | 4.9 |

The above polymer was ground and classified to 70-200 mesh powder, printed, laminated, and tested as in Example 4 with the following results:

| | |
|---|---|
| Initial T-Peel, lb./in. | 2.8 |
| Retention of Peel on Drycleaning, % | 95 |
| Retention of Peel on Laundering, % | 66 |

EXAMPLE 6

A polymer was prepared similar to Example 3 as follows:

| | Parts | % of Total Amide Equivalents |
|---|---|---|
| Caprolactam | 254.5 | 45.0 |
| Hexamethylene Diamine | 163.4 | — |
| Adipic Acid | 53.0 | 14.5 |
| Azelaic Acid (Emerox 1144) | 95.3 | 20.25 |
| Sebacic Acid | 102.5 | 20.25 |
| Acetic Acid | 3.6 | — |

Emerox 1144 is a commercial azelaic acid sold by Emery Industries and reported to contain typically 8 percent other diacid impurities.

Characterization tests were:

| | |
|---|---|
| Melt Index, decigrams/min. | 39 |
| Minimum Flow Temperature, °C. | 122 |
| Heat of Fusion, cal./g. | 8.5 |

Physical measurements on a molded film which was well crystallized by slow cooling from the melt and conditioned for 2 days at 50 percent relative humidity at 23° C., gave the following results.

| | |
|---|---|
| Initial Tensile Modulus, psi | 75,000 |
| Approximate Yield Point, psi | 4,300 |
| Elongation at Yield, % | 7 |
| Tensile Strength, psi | 6,300 |
| Elongation at Break, % | 480 |

EXAMPLE 7

A polymer was prepared similar to Example 3 as follows:

| | Parts | % of Total Amide Equivalents |
|---|---|---|
| Caprolactam | 248.5 | 45.8 |
| Hexamethylene Diamine | 151.3 | — |
| Diethylene Triamine | 2.48 | — |
| Adipic Acid | 44.2 | 12.6 |
| Azelaic Acid (Emerox 1144) | 99.5 | 22.0 |
| Dodecanedioic Acid | 108.3 | 19.6 |
| Acetic Acid | 2.88 | — |

Characterization tests were:

| | |
|---|---|
| Melt Index, decigrams/min. | 34 |
| Minimum Flow Temperature, °C. | 123 |
| Heat of Fusion, cal./g. | 4.4 |

EXAMPLE 8

A polymer was prepared similar to Example 3 as follows:

| | Parts | % of Total Amide Equivalents |
|---|---|---|
| Caprolactam | 260.0 | 46.0 |
| Hexamethylene Diamine | 158.4 | — |
| Azelaic Acid (Emerox 1144) | 84.6 | 18.0 |
| Sebacic Acid | 90.9 | 18.0 |
| Dodecanedioic Acid | 103.8 | 18.0 |
| Acetic Acid | 1.5 | — |

Characterization tests were:

| | |
|---|---|
| Melt Index, decigrams/min. | 22 |
| Minimum Flow Temperature, °C. | 113 |
| Heat of Fusion, cal./g. | 6.1 |

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims. For example, substitution of one polymethylene chain for another has a relatively small predictable effect. But in any case, substitutions can be empirically evaluated and shifts in relative proportions can be made to compensate, at least in part, for certain observed effects.

I claim:

1. A melt-condensed polyamide interpolymer consisting essentially of at least four different recurring polyamide repeat units in which a. 35 to 55 percent of the amide equivalents are polymethylene-ω-aminoacid repeat units of six to 20 carbon atoms, b. 10 to 30 percent of the amide equivalents are diamine diacid repeat units in which the diamine is polymethylene diamine of six to 20 carbon atoms and the diacid is polymethylene diacid of six to 20 carbon atoms, c. 10 to 30 percent of the amide equivalents are diamine diacid repeat units in which the diamine is polymethylene diamine of six to 20 carbon atoms and the diacid is polymethylene diacid of six to 20 carbon atoms different from the diacid of (b) above, and d. 10 to 30 percent of the amide equivalents are diamine diacid repeat units in which the diamine is polymethylene diamine of six to 20 carbon atoms and the diacid is polymethylene diacid of six to 20 carbon atoms different from the diacids of (b) and (c) above, said polyamide interpolymer having a crystalline heat of fusion of 3 to 15 calories per gram and melting completely at 125° C.

2. The melt-condensed polyamide interpolymer of claim 1 which has a melt index of 0.1 to 200 at 190° C.

3. The melt-condensed polyamide interpolymer of claim 2 in which a. 40 to 55 percent of the amide equivalents are omega-aminocaproic acid repeat units, b. 10 to 25 percent of the amide equivalents are hexamethylene adipamide repeat units, c. 10 to 25 percent of the amide equivalents are hexamethylene diamine diacid repeat units in which the diacid is polymethylene diacid of nine to 12 carbon atoms, and d. 10 to 25 percent of the amide equivalents are hexamethylene diamine diacid repeat units in which the diacid is polymethylene diacid of nine to 12 carbon atoms different from the diacid of (c) above.

4. The melt-condensed polyamide interpolymer of claim 3 which has a melt index of 1 to 20.

5. The melt-condensed polyamide interpolymer of claim 1 in which a. 35 to 55 percent of the amide equivalents are omega-aminocaproic acid repeat units, b. 10 to 30 percent of the amide equivalents are diamine diacid repeat units in which the diamine is polymethylene diamine of six to 20 carbon atoms and the diacid is selected from the group consisting of adipic, azelaic, sebacic and dodecanedioic acids, c. 10 to 30 percent of the amide equivalents are diamine diacid repeat units in which the diamine is polymethylene diamine of six to 20 carbon atoms and the diacid is a member of the group consisting of adipic, azelaic, sebacic and dodecanedioic acids which is different from the diacid of (b) above, and d. 10 to 30 percent of the amide equivalents are diamine diacid repeat units in which the diamine is polymethylene diamine of six to 20 carbon atoms and the diacid is a member of the group consisting of adipic, azelaic, sebacic and dodecanedioic acids which is different from the diacids of (b) and (c) above.

6. The melt-condensed polyamide interpolymer of claim 5 in which the polymethylene diamine is hexamethylene diamine.

7. The melt-condensed polyamide interpolymer of claim 6 in which up to 30 mole percent of the hexamethylene diamine is replaced by an aliphatic diamine of two to 20 carbon atoms.

8. The melt-condensed polyamide interpolymer of claim 7 in which the aliphatic diamine is ethylene diamine.

9. The melt-condensed polyamide interpolymer of claim 5 in which 10 to 15 percent of the amide equivalents are diamine diacid in which the diacid is adipic acid.

* * * * *